(12) United States Patent
Saini et al.

(10) Patent No.: US 7,793,250 B2
(45) Date of Patent: Sep. 7, 2010

(54) TOPOLOGY-DRIVEN APPARATUS, METHOD AND COMPUTER PROGRAM PRODUCT FOR DEVELOPING A WIRING DESIGN

(75) Inventors: Satpal Saini, Lake Forest Park, WA (US); Ronald G. Fonden, Federal Way, WA (US); Patrick H. Riedl, Seattle, WA (US); Sewon Hong, Torrance, CA (US); Teresa A. Moore, St. Charles, MO (US); Paul E. Shappell, Covington, WA (US)

(73) Assignee: The Boeing Company, Chicago, IL (US)

( * ) Notice: Subject to any disclaimer, the term of this patent is extended or adjusted under 35 U.S.C. 154(b) by 1268 days.

(21) Appl. No.: 11/305,965

(22) Filed: Dec. 19, 2005

(65) Prior Publication Data

US 2007/0141899 A1 Jun. 21, 2007

(51) Int. Cl.
*G06F 17/50* (2006.01)
*G06T 15/00* (2006.01)
*G09G 5/00* (2006.01)
*H01R 43/20* (2006.01)
*H01R 43/00* (2006.01)
*H01K 3/22* (2006.01)

(52) U.S. Cl. .............. 716/14; 716/12; 716/13; 716/15; 345/419; 345/420; 345/689; 29/747; 29/851; 29/857; 29/861; 29/866

(58) Field of Classification Search ............ 716/1, 716/12–14; 29/854, 857; 345/419, 420, 345/689; 174/72 A
See application file for complete search history.

(56) References Cited

U.S. PATENT DOCUMENTS

| | | | |
|---|---|---|---|
| 6,484,182 B1 * | 11/2002 | Dunphy et al. ................ 707/3 |
| 6,606,731 B1 * | 8/2003 | Baum et al. .................... 716/3 |
| 6,813,749 B2 * | 11/2004 | Rassaian ......................... 716/4 |
| 6,990,649 B2 * | 1/2006 | Claras ........................... 716/11 |
| 7,024,341 B2 * | 4/2006 | Barrow et al. .................. 703/1 |
| 7,082,590 B2 * | 7/2006 | Kragh et al. .................. 716/13 |
| 7,135,790 B2 * | 11/2006 | Fondriest ..................... 307/147 |
| 7,246,328 B2 * | 7/2007 | Boose et al. ................ 715/805 |
| 7,327,869 B2 * | 2/2008 | Boyer .......................... 382/141 |
| 7,478,352 B2 * | 1/2009 | Chaplin et al. ................. 716/7 |
| 7,590,496 B2 * | 9/2009 | Blemel ........................ 702/35 |
| 2003/0101029 A1 | 5/2003 | Drumheller |
| 2003/0237057 A1 | 12/2003 | Riedl et al. |
| 2008/0304418 A1 * | 12/2008 | Fournier et al. ............. 370/242 |

* cited by examiner

*Primary Examiner*—Helen Rossoshek
(74) *Attorney, Agent, or Firm*—Alston & Bird LLP

(57) ABSTRACT

A method for developing a wiring design for a complex system includes creating a master wire harness network (MWHN) within pathway space reservations of a pathway space-reservation network of the complex system. In this regard, the MWHN can comprise a model of possible wiring pathways between equipment of the complex system, and can include wire harness elements interconnecting termination device elements. The method can also include importing a subsystems definition capable of being represented by interconnections between the equipment. Thus, one or more logical net harnesses (LNHs) can be created based upon the MWHN and the subsystems definition. The LNH, then, can comprise a collection of interconnections routed within the MWHN. One or more logical wire harnesses (LWHs) can be created based upon the LNHs, after which one or more end-item configurations (EICs) can be created based upon the LWHs.

15 Claims, 14 Drawing Sheets

TOPOLOGY-DRIVEN APPARATUS, METHOD AND COMPUTER PROGRAM PRODUCT FOR DEVELOPING A WIRING DESIGN

FIELD OF THE INVENTION

The present invention relates generally to apparatuses and methods for developing wiring designs to integrate systems definitions within a large-scale, complex system of systems and, more particularly, to topology-driven apparatuses and methods for developing wiring designs to integrate systems definitions.

BACKGROUND OF THE INVENTION

Large-scale system integration (such as an airplane, space shuttle, space station, ship, submarine, helicopter, power plant, large complex building, aircraft carrier, or the like) is typically a complex undertaking. In this regard, such large-scale systems (sometimes referred to as a "system of systems") often include a working conglomeration of smaller-scale systems (systems), which themselves often include even smaller-scale systems (subsystems), and so forth. Notwithstanding the necessity of building, retaining, and imparting an overall vision of a large-scale system, it is nevertheless imperative that such a system be defined in detail to the level of the individual constituent components that together bring the over all system to physical being.

The overall design of a large-scale system often includes a wiring design that integrates the transport elements of the smaller-scale subsystems and their components included therein. A transport element can be understood to represent a means for transporting information between systems and/or subsystems, and can comprise, for example, a wire, a tube, a duct, a fiber optic strand or radio frequency, etc. Conventionally, such wiring designs have been developed manually, serially and often with a high rate of change. In the aerospace industry, for example, developing a large-scale system-level wiring design, engineers for the subsystems often select baseline wiring designs that best fit the functionality of the respective subsystem. A wiring integration engineer receives these baseline subsystem designs for aggregation into wire harnesses for integrating the subsystems transport elements within the context of the product being built. As many systems are designed within limited space, the resulting wire harnesses are often designed to include multiple subsystems, as opposed to being dedicated to each subsystem. Each system and subsystem has unique requirements that must be met by the integrated wiring harness designs.

Conventional techniques for developing large-scale system-level wiring harness designs are often very complex, repetitive and based on large numbers of design artifacts such as virtual and hardcopy documents, i.e., schematic diagrams, data tables, instructional text, exploded graphic views, and so forth. In the aerospace industry, for example, developing a set of logical wire harnesses often includes collecting Air Transport Association (ATA) level system schematics or other defined system categorization strategies. Roadmaps of wire harnesses are then manually created within the geometric constraints of an aircraft defining the raceways through which the harnesses can be routed therein. The wiring roadmap must account for all of the production breaks within the aircraft. Next, the roadmaps are manually transformed into wiring diagrams using a Computer-Aided Drawing Design (CADD) system. Wire harness data is then authored based upon the wiring diagram notations and stored in a database that holds each element of the wiring harness design data. In one authoring technique, for example, the wiring diagrams can be integrated via a computing function to generate wire harness data. In another technique, for example, wire harness data can be authored manually via wiring diagram inter-group inputs. In accordance with these techniques, information is shared between designers to permit the designers to collect wire harness delta changes required to define the content of the wire harnesses and enter the data into a wiring database. Manual data synchronization is then performed between the CADD system and the wiring database to ensure the integrity and intent of the design is maintained. The sole source authority to build the wire harness is the wiring database and not the CADD wiring diagram.

To complete the development of an aircraft-level wiring design, an engineering bill of material (BOM) is then generated for each wire harness. The BOM for each wire harness identifies and lists all raw materials, subassemblies, parts, and even the intangibles that may be required to manufacture and install the respective wire harness. Regulatory agencies often require maintaining configuration control of the wire harness throughout its life cycle—from its development through installation in the product and throughout the life of the product. Each wire harness is configured under a unique part number. The authorizations for the designs must also be tracked along with the changes made to a wire harness. For every delta change, the wire harness part number is rolled after the wire harness has been installed in the product to manage configuration control of the wire harness. In other words, the designer must be able to show which change authorization changed what content of the wire harness. In this regard, manual audits can be performed to ensure the design meets customer specifications and requirements.

Whereas techniques for developing large-scale system-level wiring designs such as that described above are adequate, such techniques have drawbacks and require manpower to overcome the process and tool shortcomings. Small changes in a design often require revision to a large percentage of the harnesses and diagrams for every customer. For example, a twenty-percent change in a design can require revision to eighty percent or more of the wire harnesses and diagrams for every customer. In such instances, a wiring design engineer can spend approximately thirty-two percent of their available resources on creating new wiring diagrams, and then consume another fifteen percent of those resources to synchronize the CADD and wiring databases. As a result of re-entry of the same data in multiple computing systems, the error rate in harness designs can be very high. In addition, the wiring design engineer often has to wait to ensure that he/she has received all inputs from subsystem designers (e.g., pin to pin definition of the system functionality) before the engineer can proceed to integrate those systems. And as the engineer is typically never sure that the entire design intent of a system change has been included in the wiring design or redesign, and if any information is missing, that information is typically not discovered until functional testing of the system is performed after the installation into the product.

A high rate of change in re-engineered wire harnesses is non-value added work because of multiple baselines used by the system designers. As a consequence, the high rate of change in wiring configuration often leads to out-of-sequence work and has a very large impact on the downstream customers of wire harnesses, such as manufacturing, fabrication and installation processes and products.

SUMMARY OF THE INVENTION

In view of the foregoing background, exemplary embodiments of the present invention provide a topology-driven wiring apparatus, method and computer program product for developing logical wire harnesses for a complex system such as an aircraft. Exemplary embodiments of the present invention are capable of dynamically collecting and presenting "linked data and associated relationships" within an editable graphical user interface environment. Thus, a master wire harness network, as well as individual logical wire harnesses and/or connective equipment, can be developed in-context of the physical shape and parameters of the product such as an aircraft. Such data may include, for example, systems-defined functional equipment, connectivity design data, installations-defined geometric equipment/pathway space reservations and/or safety/hazard environmental requirements data.

As the electrical wiring design is developed and matured in accordance with exemplary embodiments of the present invention, business/design rule-based constraints, scripts, wizards and/or checks/audits (e.g., separation/protection, routing, part selection, termination, etc.) can be dynamically applied to facilitate effective implementation of design processes/standards/constraints and design data configuration control/management. Such dynamic interaction of the rule sets during the design development may reduce, if not eliminate, manual/visual validation and verification of requirements, and/or may enhance/maintain the design and data integrity.

According to one aspect of the present invention, a method is provided for developing a wiring design for a complex system. The method can include providing a complex system architecture that includes a geometric pathway space-reservation network, where the pathway network includes pathway space reservations for placement of wiring interconnecting the equipment placed within the geometric design. After providing or otherwise capturing the complex system architecture, a master wire harness network (MWHN) can be created within pathway space reservations of the geometric pathway network. In this regard, the MWHN can be considered a possible wiring roadmap between equipments of the complex system, and can include wire harness elements between or otherwise interconnecting termination device elements. The method can also include importing a subsystems definition capable of being represented by interconnections, such as signal/net or net family interconnections, between the equipments. Thus, one or more logical net harnesses (LNHs) can be created based upon the MWHN and the subsystems definition. The LNH can include a collection of interconnections grouped and routed within the MWHN. Thus, creating the LNHs can include grouping the collection of interconnections into one or more compatible net family groups (CNFGs) and routing the CNFGs within the MWHN. In such instances, the CNFGs include interconnections having at least one common attribute between the equipments.

The method can also include creating one or more logical wire harnesses (LWHs) based upon the LNHs. In such instances, the LWH can comprise a collection of cabling elements (e.g., cables, wires, etc.) and termination devices associated with a respective logical wire harness element of the MWHN. Further, the method can include deriving one or more end-item configurations (EICs) for the complex system based upon the LNHs and LWHs. The EICs, then, can comprise unique collections of one or more wiring elements and termination devices of an LWH.

Apparatuses and computer program products for developing an electrical wiring design for a complex system are also provided in accordance with other aspects of the present invention.

BRIEF DESCRIPTION OF THE DRAWINGS

Figure 1:
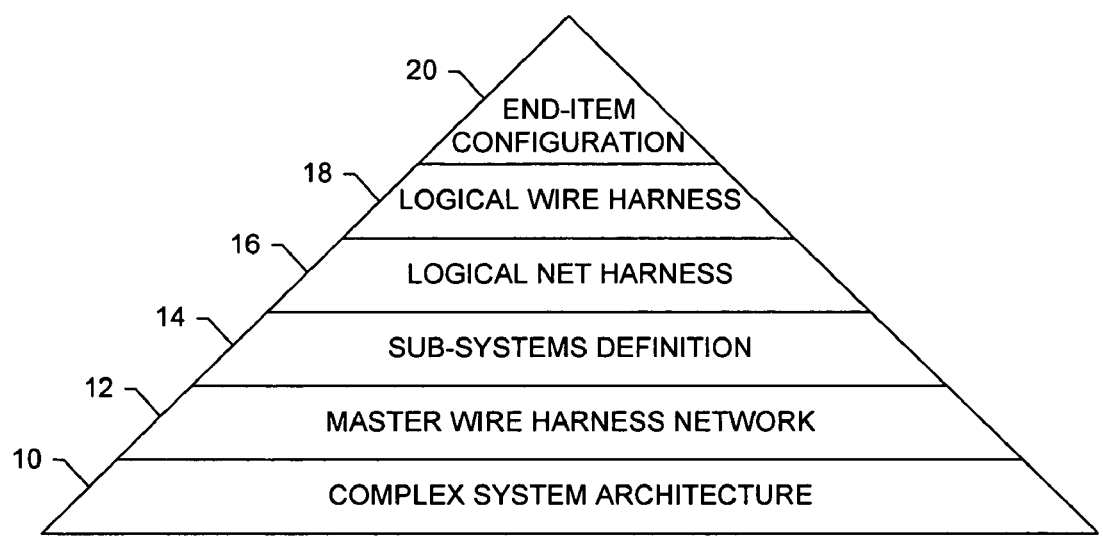
Figure 2:
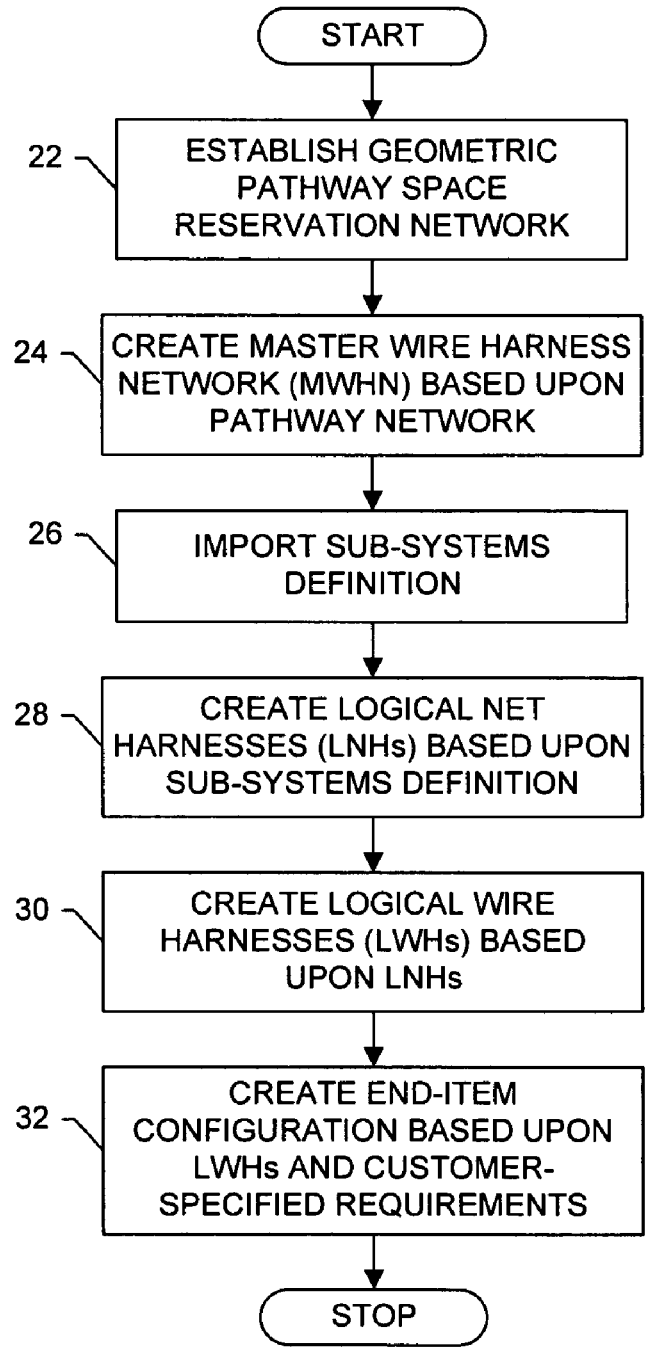
Figure 3:
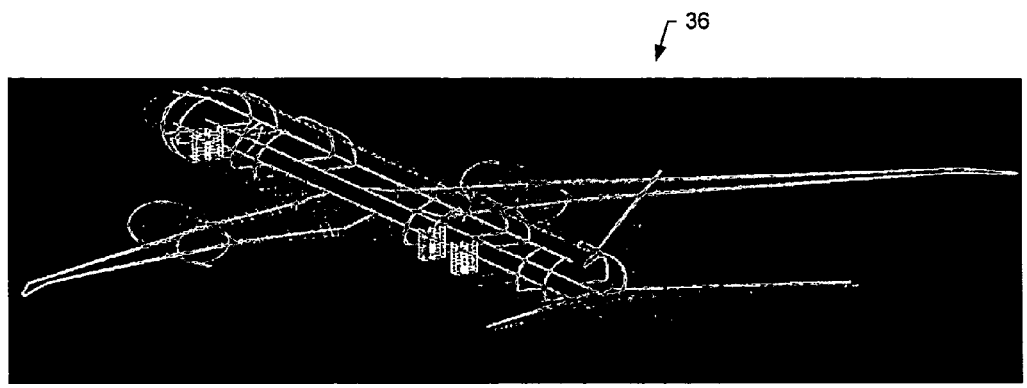
Figure 4:
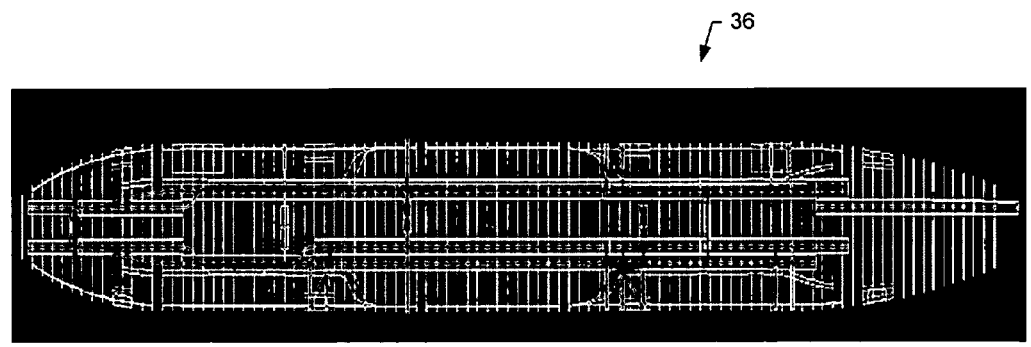
Figure 5:
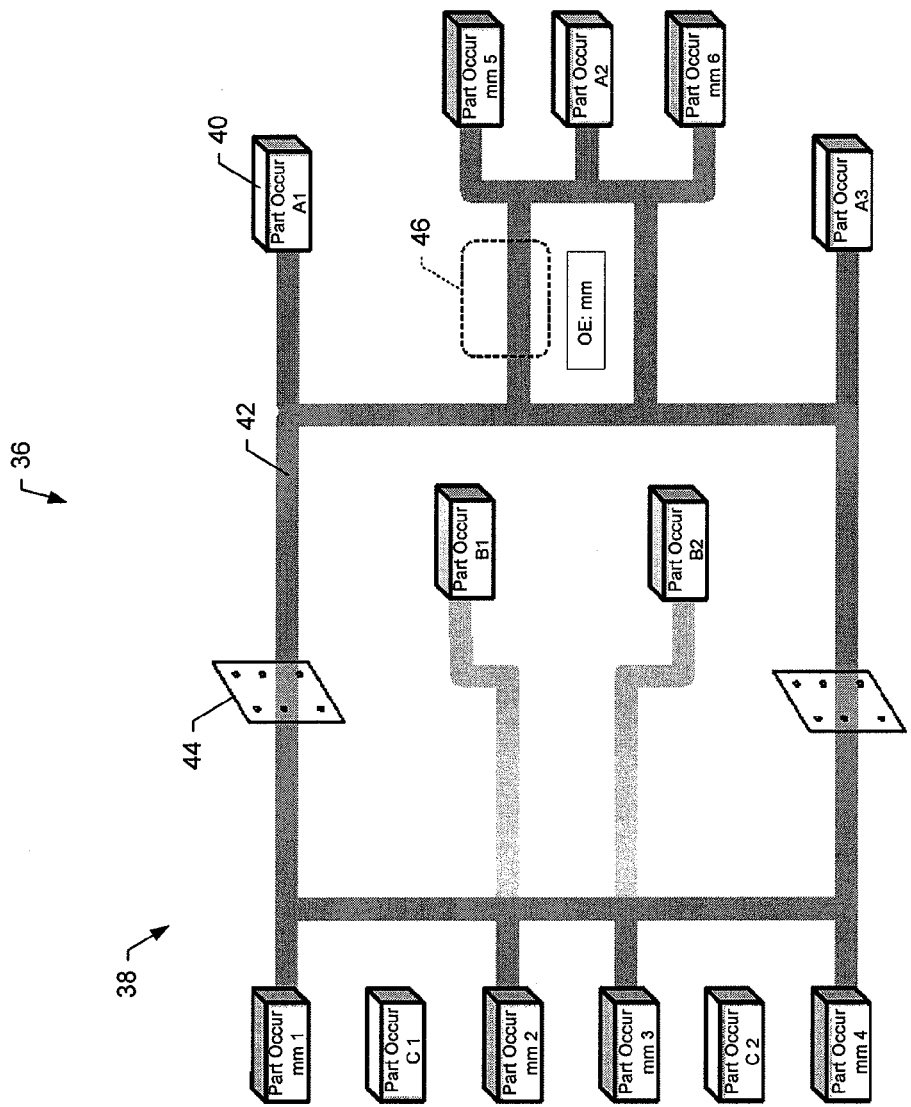
Figure 6:
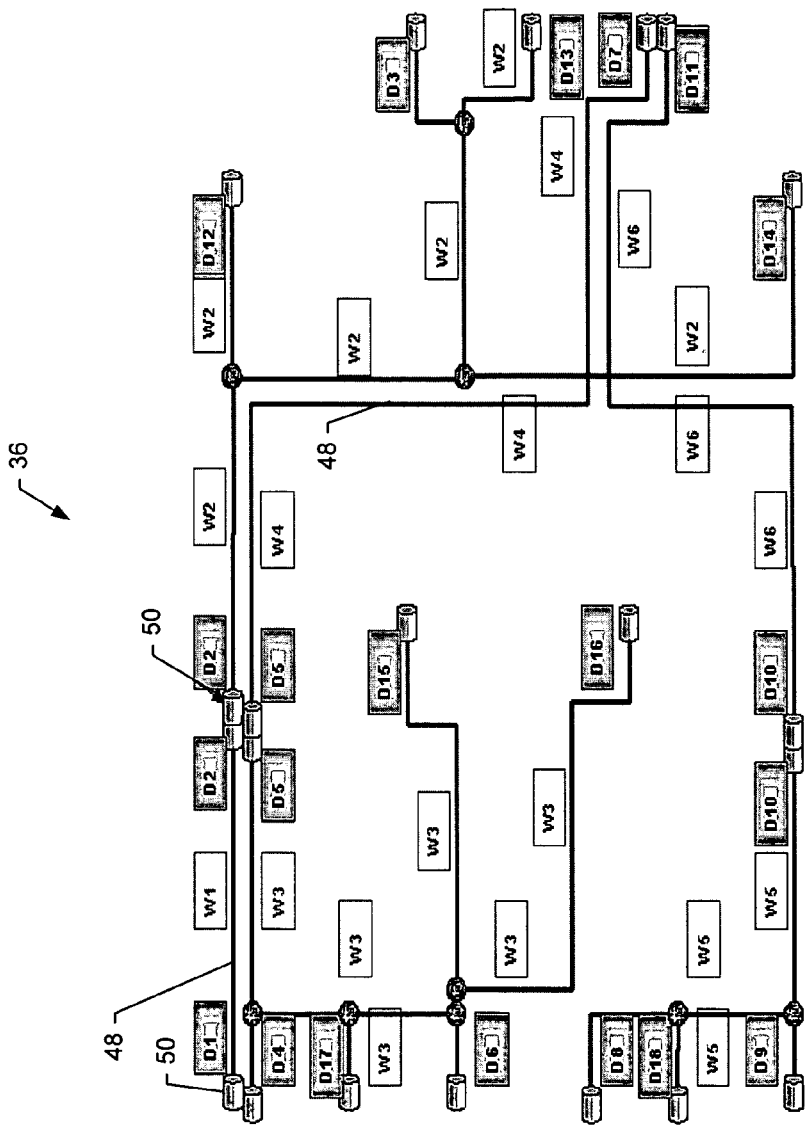
Figure 7:
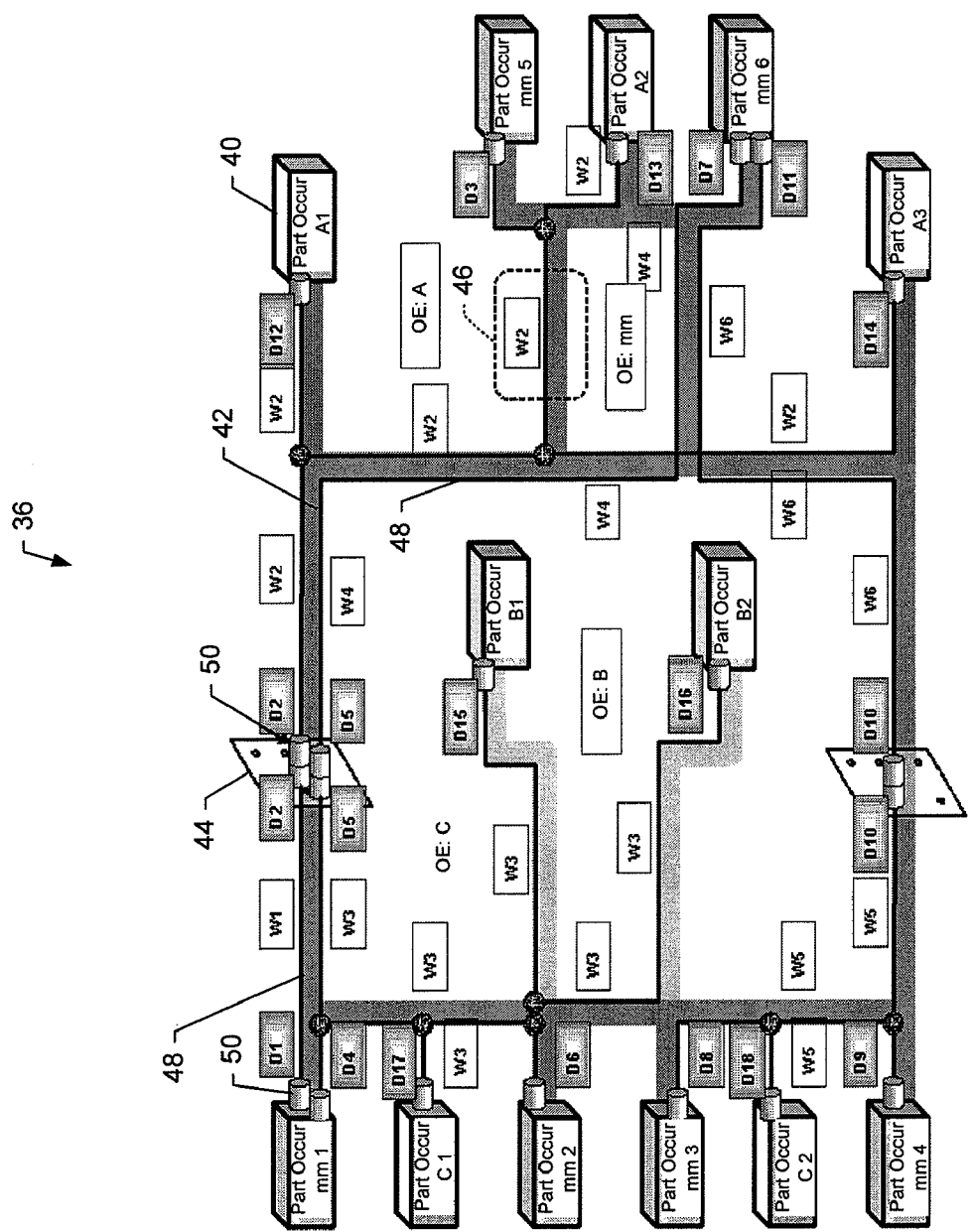
Figure 8:
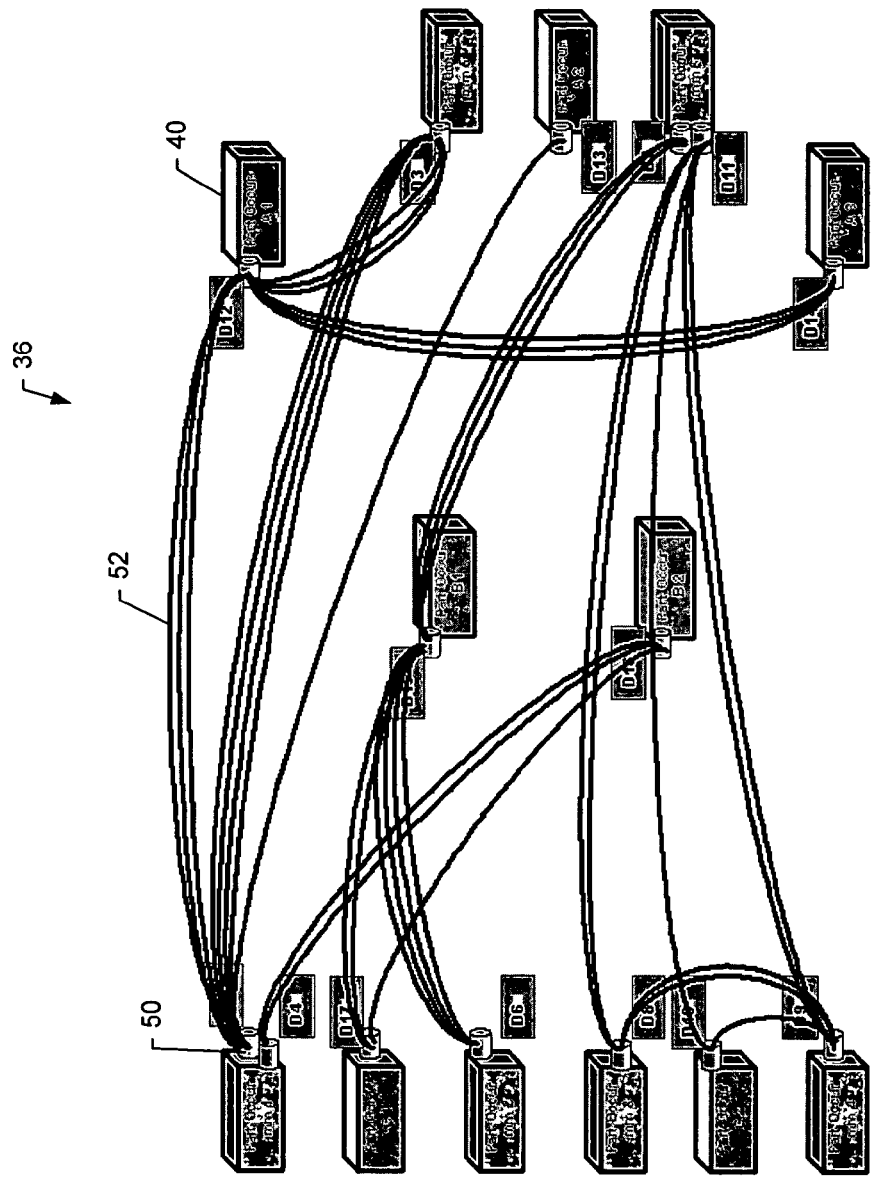
Figure 9:
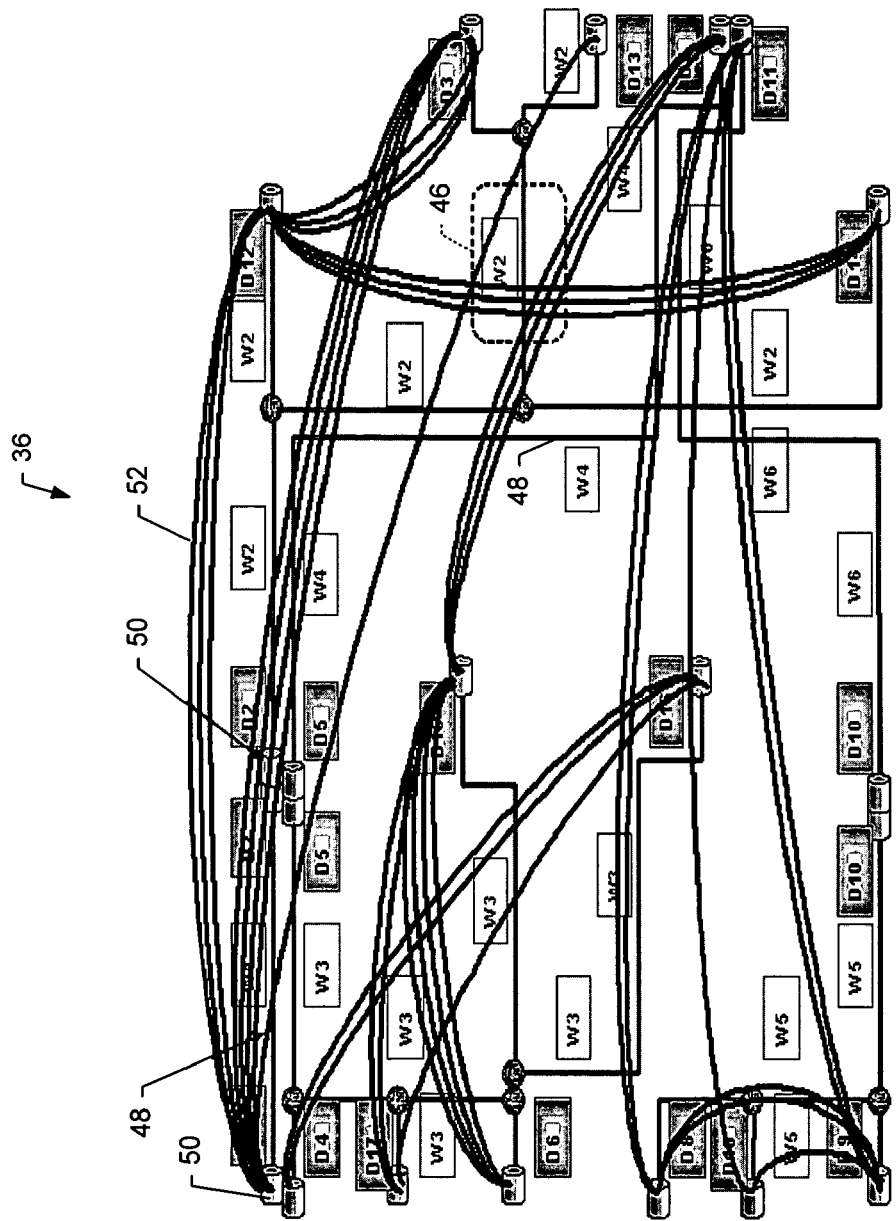
Figure 10:
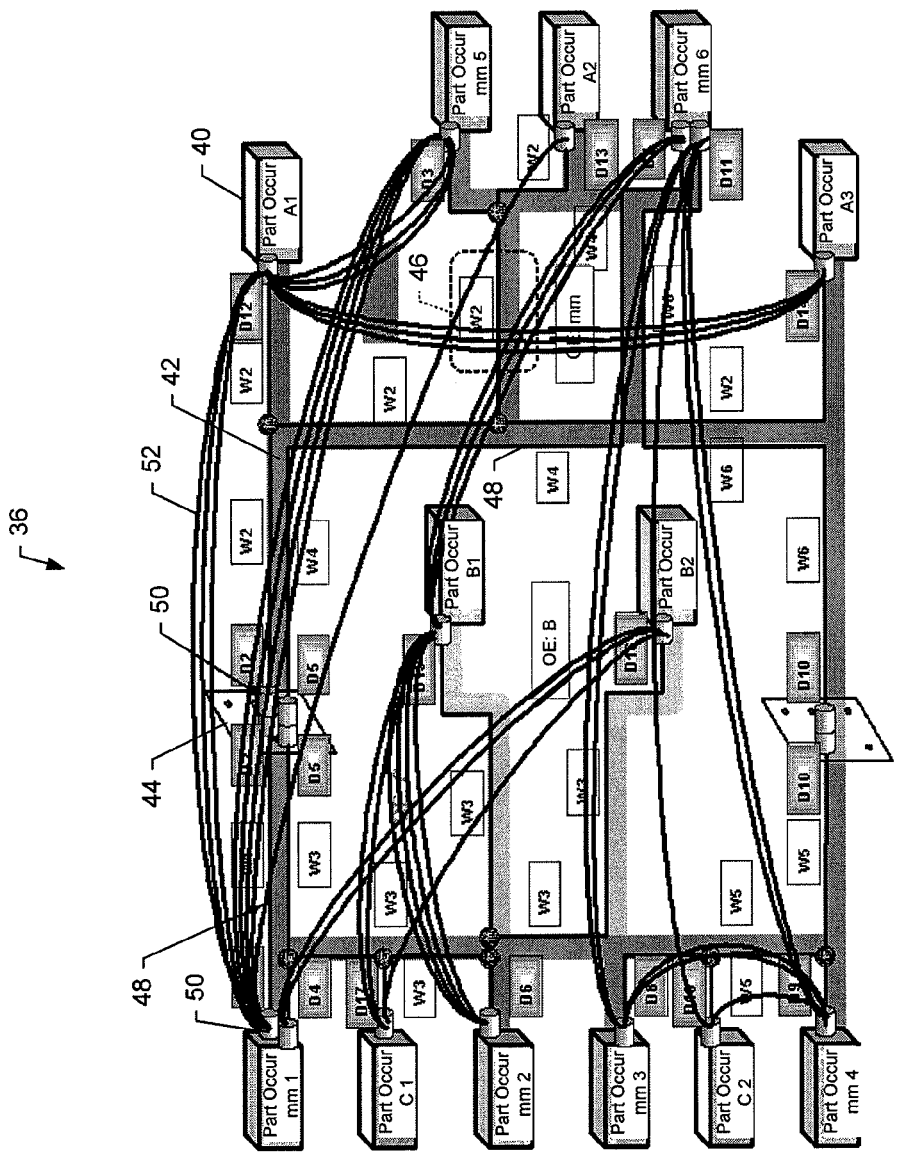
Figure 11:
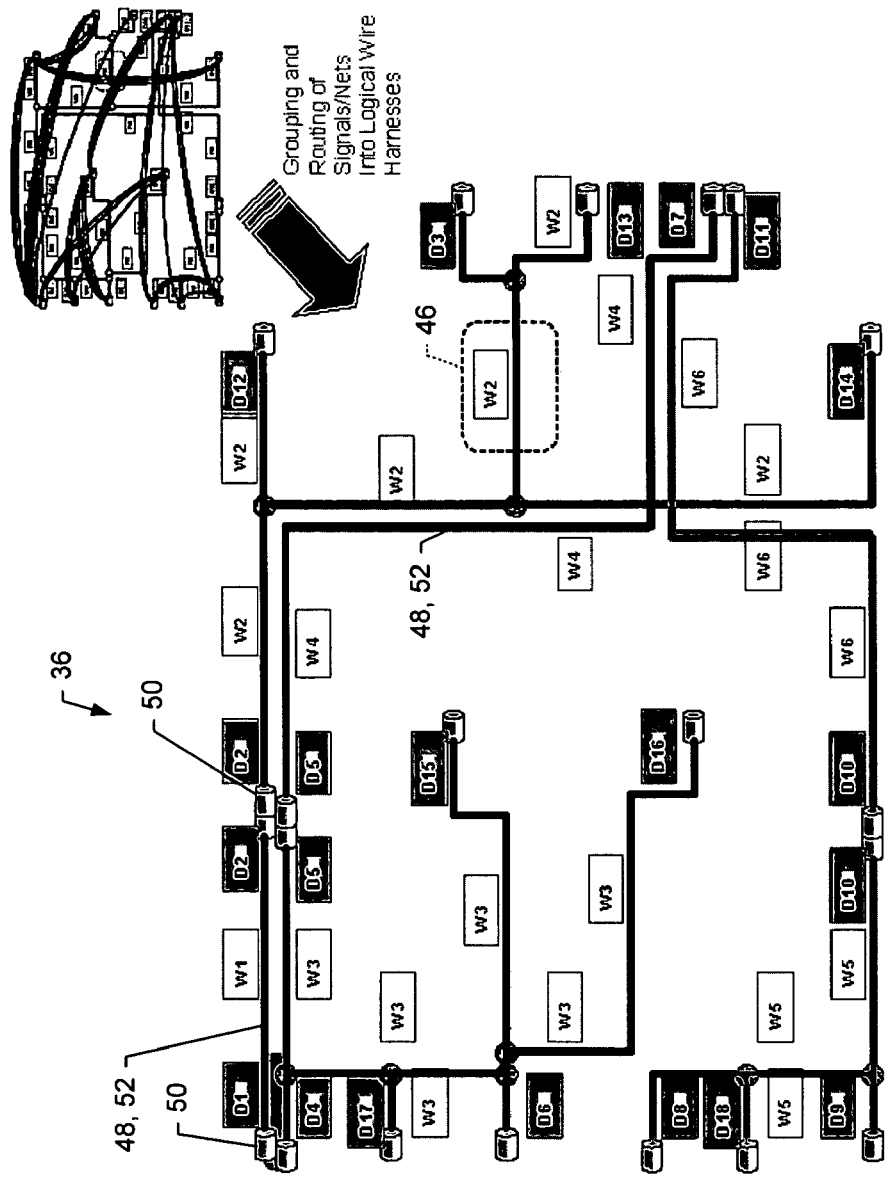
Figure 12:
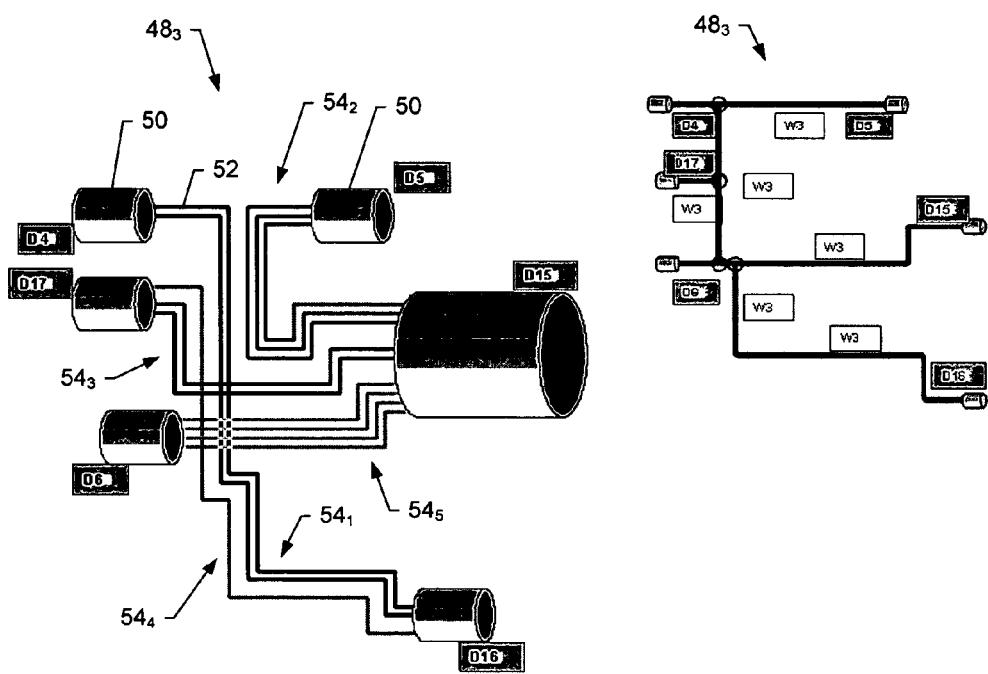
Figure 13:
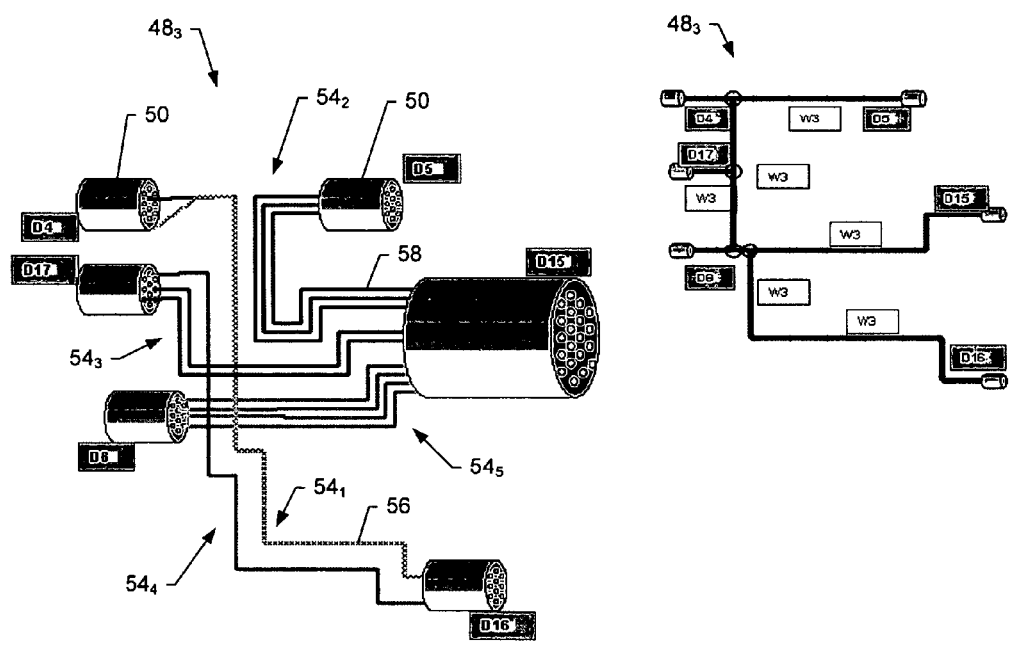
Figure 14:
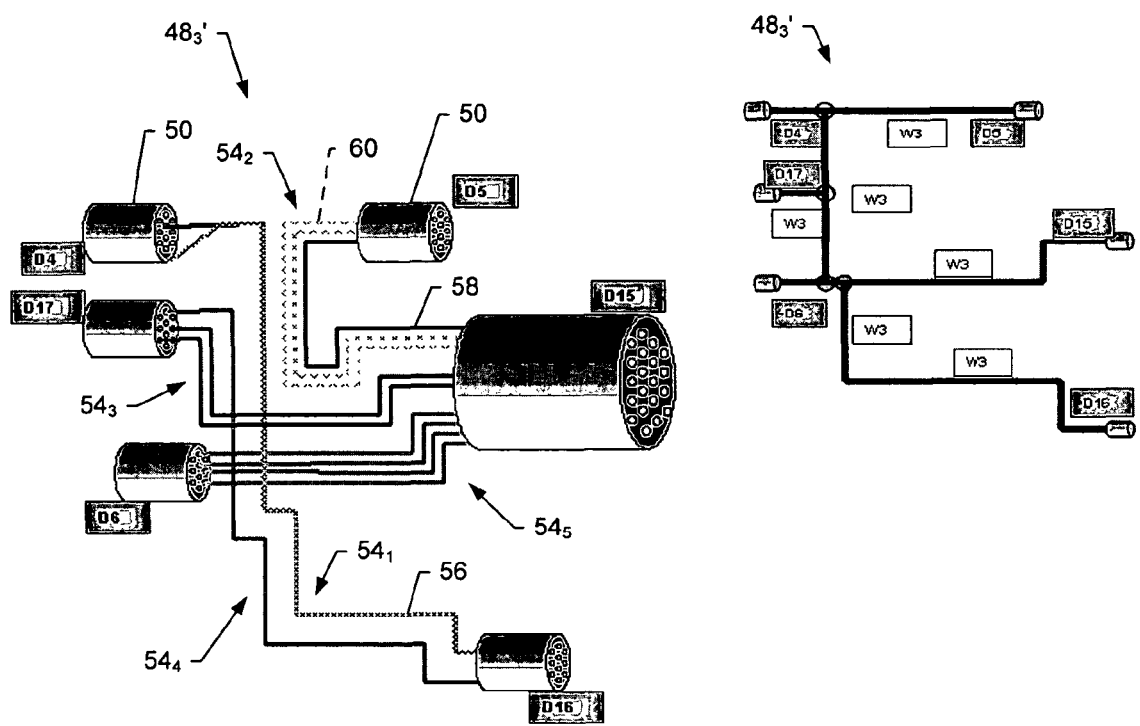
Figure 15:
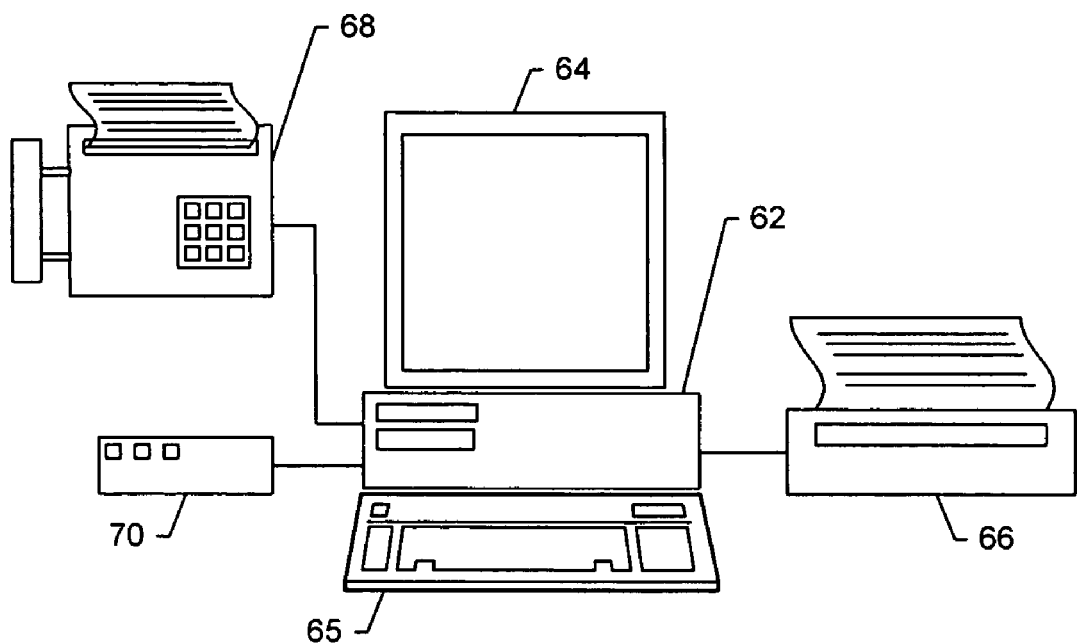

Having thus described the invention in general terms, reference will now be made to the accompanying drawings, which are not necessarily drawn to scale, and wherein:

FIG. 1 is a hierarchical organization of a number of components created or otherwise provided during development of a wiring design for a complex system, in accordance with one embodiment of the present invention;

FIG. 2 is a flowchart illustrating various steps in a method of developing a wiring design for a complex system, in accordance with exemplary embodiments of the present invention, in accordance with one embodiment of the present invention;

FIGS. 3 and 4 illustrate graphical representations of an isometric view and a top view, respectively, of an aircraft architecture electrical wiring design provided in the development of a wiring design for an aircraft, in accordance with one embodiment of the present invention;

FIG. 5 is a schematic illustration of an aircraft architecture electrical wiring design including an equipment/pathway space-reservation network, in accordance with one embodiment of the present invention;

FIGS. 6 and 7 are schematic illustrations of a master wire harness network (MWHN) without an equipment/pathway space-reservation network, and overlaid on an equipment/pathway space-reservation network, respectively, in accordance with one embodiment of the present invention;

FIGS. 8, 9 and 10 are schematic illustrations of signal/net design data elements with reference to the equipment space reservations without the pathway space, with reference to the MWHN without the equipment/pathway space-reservation network, and overlaid on an equipment/pathway space-reservation network and MWHN, respectively, in accordance with one embodiment of the present invention;

FIG. 11 is a schematic illustration of logical net harnesses (LNHs) within a MWHN, in accordance with one embodiment of the present invention;

FIG. 12 is a schematic illustration of a number of compatible net family groups (CNFGs) created within a wire harness segment of a MWHN, in accordance with one embodiment of the present invention;

FIGS. 13 and 14 are schematic illustrations of two logical wire harnesses (LWHs) associated with the wire harness segment of FIG. 12, in accordance with one embodiment of the present invention; and FIG. 15 is a schematic block diagram of the apparatus of one embodiment of the present invention embodied by a computer.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth; rather, these embodiments are provided so that this disclosure will be thorough and complete, and will fully convey the scope of the invention to those skilled in the art. Like numbers refer to like elements throughout.

Referring to FIGS. 1 and 2, a hierarchical organization and flowchart are presented for developing a wiring design for a complex system, in accordance with exemplary embodiments of the present invention. At the outset, it is important to note that exemplary embodiments of the present invention may be implemented to develop a wiring design for any type of simple or complex system. The network system may be resident in an automobile, aircraft, spacecraft, vehicle, building, factory, or any other packages, structures, or environment. As examples, exemplary embodiments of the present invention may be implemented to develop a wiring design for a complex system resident on a rotary-wing aircraft, in which the network includes a plurality of systems and subsystems that may be electronically interconnected and in communication with one another for proper operation of the network system.

More particularly, exemplary embodiments of the present invention may be implemented to develop a wiring design for an n-level complex network system where each level above the lowest level generally contains groupings of components of the level below. For example, a four level complex system may include units/components at the first, lowest level. At the next level, then, the system may include subsystem components, and then include system components at the third level. The system components can comprise groups of the respective subsystem components, and the subsystem components can comprise groups of the units/components. In an aircraft, for example, the fourth level might comprise an aircraft, with the third, second and first levels comprising systems, subsystems and components of the respective aircraft.

In accordance with exemplary embodiments of the present invention, the term topology can generally be defined as "the study of anatomy based on regions or divisions of the body and emphasizing the relations between various structural members of the body." More particularly, the term topology can represent "linked data and associated relationships" between functional/logical and physical design-data elements associated with the development of electrical wiring design elements. As these electrical wiring design elements are defined, integrated and matured, the "linked data and associated relationships" establish an integrated hierarchical-like structure, which can be captured and stored within a relational database. In this regard, development of a wiring design for a complex system, such as an aircraft, can be represented by a hierarchical-like progression of electrical wiring design definitions, which may begin with providing a complex system architecture base 10. Development of the wiring design can then extend upward through creating, designing or otherwise providing a master wire harness network 12, subsystems definition 14, logical net harness 16, logical wire harness 18 and end-item configuration 20, as explained in greater detail below.

As shown in block 22 of FIG. 2, a method of developing a wiring design for a complex system can include establishing a geometric pathway space-reservation network, which may be included within the architecture 10 of the complex system (shown at the base of the hierarchical organization of FIG. 1). In this regard, the system architecture can include a collection of interrelated (a) systems-defined system-to-system electrical interfaces and relative equipment locations, (b) installations-defined geometric equipment/pathway space-reservation network and environmental zones, and (c) the general complex system graphical outline definitions associated with a particular complex system configuration. As will be appreciated, this complex system architecture of "linked data and associated relationships" can be represented as a graphical network of design data elements within the context of the general complex system graphical outline, and serve as a foundation for other electrical wiring design-related element creation and maturity efforts. FIGS. 3 and 4, for example, illustrate graphical representations of a three-dimensional (3D) isometric view and a top view respectively, of an electrical wiring design 36 within an aircraft's structural outline architecture, or more particularly the installations-defined geometric equipment/pathway space-reservation network and environmental zones of an aircraft architecture, which may be displayed or otherwise presented by any of a number of different electronic media.

As shown in FIGS. 3 and 4, and more particularly in the schematic graphical representation of FIG. 5, the equipment/pathway space-reservation network of the electrical wiring design 36 can include equipment space reservations 40 of aircraft equipment for placement at their respective equipment locations. A pathway space-reservation network 42, then, can include a number of pathways for routing and installation of the electrical wiring interconnecting the aircraft equipment. Accordingly, the pathway space reservations can directly or indirectly interconnect the equipment space reservations. As also shown, due to other system constraints, the equipment/pathway space-reservation network may include one or more production breaks 44 subdividing a pathway space reservation, and/or one or more environmental regions 46 through which a pathway space reservation may extend.

After providing the pathway space-reservation network 42 of the complex system, a master wire harness network (MWHN) 12 can be created within the pathway space-reservation network, as shown in block 24. As shown in FIG. 6 (without the equipment/pathway space-reservation network) and FIG. 7 (overlaid on equipment/pathway space-reservation network), a MWHN can include a model of most, if not all, possible electrical wiring pathways between the complex system's active equipment and connective equipment through an established maximum configuration network of interconnected, unpopulated wire harness elements 48 ("W#") and termination device (e.g., connector pair, splice) elements 50 ("D#"). The MWHN can be established within the context of the pathway space-reservation network contained within the complex system architecture. Specific location and environmental attributes associated with the system architecture, then, can be visible to the MWHN data elements via "linked data and associated relationships."

The MWHN can facilitate the grouping and routing (manual and/or auto routing) of electrical connections (imported subsystems definition) to and from termination device elements 50 for the purpose of developing and evolving logical net harness (LNH) content into logical wire harness (LWH) content. But while the purpose of the MWHN is to provide a topological infrastructure for routing subsystem electrical connections, the MWHN can, in general, have some variations in configuration. For example, the MWHN can have variations in configuration for variants of a complex system (e.g., minor models in a commercial aircraft context, short takeoff and landing (STOL) aircraft, military aircraft variants or space shuttle payload variants in an integrated defense system (IDS) context, etc.). In addition, the existence of variable LWHs may depend upon a large complex system option (e.g., a communication's option that requires, for its realization, a number of LWHs including coaxial cables from antennas to receivers).

After creating a MWHN 12, subsystems definitions 14 can be imported into the topology infrastructure of the MWHN, as shown in block 26. A subsystems definition can include a collection of systems-defined equipment, connectivity design data and requirements between active equipments. As shown in FIG. 8 (with reference to the equipment space reservations without the pathway space-reservation network and MWHN), FIG. 9 (with reference to the MWHN without the equipment/pathway space-reservation network) and FIG. 10 (overlaid on equipment/pathway space-reservation network and MWHN), such design data and requirements can be represented by end-to-end interconnections, such as signal/net or net family interconnections 52, at the pin-to-pin level. These connectivity signal/net design data elements can include system requirements and constraints such as, for example, separation and environmental protection requirements necessary for their collective grouping and routing within the MWHN.

After importing the subsystems definition 14, one or more logical net harnesses (LNHs) 16 can be created based on the MWHN 12 and subsystems definition 14, as shown in block 28. As shown in FIG. 11, a LNH can include a collection of grouped signals/nets or net families 52 routed within the MWHN between any two termination device elements 50 and/or production breaks contained within the topology infrastructure of the MWHN. Thus, a LNH can be created via "linked data and associated relationships" between the grouped/routed signals/nets or net families and compatible net family groups (CNFGs) within the context of the MWHN (wire harness elements, termination device elements, etc.).

The CNFGs can represent signals/nets or net families 52 that have one or more common attributes (e.g., separation, gauge, etc.) and share endpoints (two or more active equipments). In this regard, signals/nets or net families can be grouped into individual CNFGs, each of which in turn can then be routed within the MWHN 12 by a single routing operation. Since grouped signals/nets or net families can be linked to individual CNFGs via the "linked data and associated relationships," multiple routing operations that would have otherwise been required to route each individual signal/net or net family can be reduced to a single CNFG routing operation. Once the routing operations are complete, each CNFG passing through an individual MWHN route (i.e., through a wire harness element 48 between termination device elements 50) can include a unique set of signals/nets or net families. See FIG. 12, for example, for a particular exemplary illustration of five CNFGs $54_1$-$54_5$ created within a third wire harness element (W3) $48_3$ of a MWHN 12 of an aircraft architecture electrical wiring design 36, each CNFG including one or more signals/nets or net families 52.

The LNH collection 16 facilitates the development and conversion of grouped and routed signals/nets or net families 52 into cables, wires, terminations, and part number assignments to thereby form one or more logical wire harnesses (LWHs) 18. As such, after creating the LNHs, one or more LWHs can be created based thereon, as shown in block 30. A LWH can include a collection of wiring elements (e.g., cables, wires, etc.), termination device elements 50 (including "connector pairs") and their part number assignments associated with an individual logical wire harness 48 within the MWHN 12. Creation of the LWHs can be derived by the addition of cable/wire/termination/part number definitions as "linked data and associated relationships" to the LNHs within the context of the MWHN (wire harness elements 48, termination device elements 50, etc.). As will be appreciated, more than one LNH can have a relationship to the same LWH depending upon the customer variables. A "many-to-many" relationship, then, enables the reusability of an individual LWH to many LNH configurations or an individual LNH to many LWH configurations. See FIG. 13, for example, for a particular exemplary illustration of LWHs including coaxial cables 56, wires 58 and termination devices 50 associated with the third wire harness segment (W3) $48_3$ of FIG. 12.

The requirements/functions and rules driven design of the LWHs may require a unique relational object-oriented database model (e.g., common object model—COM) that is capable of linking the atomic level data elements (establishing relationships) of the design artifacts/objects. The COM can integrate the functional, logical, and physical design data objects and relationships into a single source of product definition (SSPD). The SSPD, then, can enable the capability to develop an electrical wiring design in-context with the functional and physical definitions.

The relational database and relationships between the objects may also allow up-and-down validation and verification of the wiring design. Exemplary embodiments of the present invention can therefore allow a user to quickly traverse from a requirement to a part that fulfills its function and vice versa (traverse from a part to the requirements and functions) to validate why the part is installed within the higher or the highest level of the product. These relationships between the objects can then also be used to set the configuration control boundaries of the design artifacts. The hierarchical configuration control of data elements allows children objects to inherit the properties and attributes of the parent object.

As with the LNH collection 16 to the LWH collection 18, the LWH collection can facilitate the derivation or creation of LWH end-item configurations (EICs) 20 for a complex system based on a customer's requirements (e.g., passenger vehicle versus cargo vehicle requirements, short range versus long range vehicle requirements, etc.). Thus, after creating the LWHs, one or more variations of LWH end-item configurations can be created based upon the existing LWHs and customer-specified requirements, as shown in block 32. An EIC can comprise a unique collection of one or more wiring elements and termination devices of an LWH associated with one or more options offered in a design options catalog to a customer, and can be represented by a "unique" wire harness part number that can be "assembled-on-order." In this regard, in the context of an aircraft, a customer can select a set of options from a design options catalog—the set of options being collected into a customer-specified requirement document. The customer-specified requirements can then identify a customer-unique configuration (applicability indicating the conditions under which the EIC is valid for use). The EIC is a unique managed entity that has customer applicability, meaning that the EIC includes information as to for whom and with what requirements it was created, when it was created, its subsequent revision status, state, and change authorization. The purpose of an EIC is to eliminate duplicate physical wire harness configurations, while enabling re-usability of existing LWH designs.

Since an EIC can be derived out of the "linked data and associated relationships" of the LNH/LWH and options (customer-specified requirement), the customer-specified requirements for other orders can be evaluated against an existing EIC, and if a match is identified therebetween, the existing EIC part number can be returned for usage. If not, a new EIC can be created, and assigned a new part number. See FIG. 14, for example, for a particular exemplary illustration of a LWH including a coaxial cable 56, wires 58 and termination devices 50 associated with an alternative wire harness segment $48_3'$ for an alternative EIC to that created from the third wire harness segment (W3) $48_3$ of FIG. 13. As shown, the alternative wire harness segment of FIG. 14 does not include a pair of wires (represented by dashed lines 60) in the second CNFG $54_2$, as does the wire harness segment of FIG. 13.

From the perspective of the topology-driven wiring apparatus, method and computer program product for developing an electrical wiring design in accordance with exemplary embodiments of the present invention, topology at its highest level can be understood to represent the establishment of a MWHN. In addition, the highest-level topology can represent the development/maturity of an electrical wiring design definition via dynamic "linked data and associated relationships" in a graphical user interface environment all within the context of a complex functional/logical/physical system architecture.

As shown in FIG. 15, the apparatus of exemplary embodiments of the present invention is typically embodied by a processing element (often referred to as a central processing unit—CPU) and associated data storage device, both of which may be comprised by a computer 62 or the like. As indicated above, the method of embodiments of the present invention can be performed by the CPU manipulating data stored in the data storage device with any one of a number of computer software programs. As shown, the computer can include a display 64 for presenting information relative to performing embodiments of the method of the present invention. In addition, the computer can have a user input interface such as a microphone, a keyboard 65, a touch display, a joystick, a mouse or other input device, that includes any of a number of devices allowing the entity to receive data from a user to perform or facilitate performance of embodiments of the method of the present invention. Further, to plot information relative to performing embodiments of the method of the present invention, the computer can further include a printer/plotter 66.

Also, the computer 62 can include a means for locally or remotely transferring the information relative to performing embodiments of the method of the present invention. For example, the computer can include a facsimile machine 68 (or software that emulates this function) for transmitting information to other facsimile machines, computers or the like. Additionally, or alternatively, the computer can include a modem 70 to transfer information to other computers or the like. Further, the computer can include an interface (not shown) to a network, such as a local area network (LAN), and/or a wide area network (WAN). For example, the computer can include an Ethernet Personal Computer Memory Card International Association (PCMCIA) card configured to transmit and receive information to and from a LAN, WAN or the like.

According to one aspect of the present invention, the apparatus of the present invention generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium. It should be understood that the computer-readable program code portions may include separate executable portions for performing distinct functions to accomplish methods of embodiments of the present invention. Additionally, or alternatively, one or more of the computer-readable program portions may include one or more executable portions for performing more than one function to thereby accomplish methods of embodiments of the present invention.

FIG. 2 is a flowchart of apparatuses, methods and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer apparatuses which perform the specified functions or steps, or combinations of special purpose hardware and computer instructions.

Many modifications and other embodiments of the invention will come to the mind of the one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for developing a wiring design for a complex system, the apparatus comprising:

a central processing unit (CPU) configured to create a master wire harness network (MWHN) within pathway space reservations of a pathway space-reservation network of a complex system, wherein the MWHN comprises a model of possible wiring pathways between equipment of the complex system, wherein the MWHN includes a network of interconnected, unpopulated wire harness elements and termination device elements, wherein the CPU is configured to import a subsystems definition into the MWHN, the subsystems definition being represented by interconnections between the equipment, and wherein the CPU is configured to create one or more logical net harnesses (LNHs) based upon the MWHN and the subsystems definition, the LNH comprising a collection of interconnections routed within the MWHN.

2. The apparatus of claim 1, wherein the CPU is configured to create one or more LNHs including grouping the collection of interconnections into one or more compatible net family groups (CNFGs) and routing the CNFGs within the MWHN, the CNFGs including interconnections having at least one common attribute.

3. The apparatus of claim 1, wherein the CPU is further configured to provide a complex system architecture, the architecture including a pathway space-reservation network, the pathway space-reservation network including pathway space reservations for placement of wiring interconnecting equipment of the complex system.

4. The apparatus of claim 1, wherein the CPU is further configured to create one or more logical wire harnesses (LWHs) based upon the LNHs, the LWH comprising a collection of wiring elements and termination devices associated with a respective wire harness element of the MWHN.

5. The apparatus of claim 4 wherein the CPU is further configured to derive one or more end-item configurations (EICs) for the complex system based upon the LWHs, the EIC comprising a unique collection of one or more wiring elements and termination devices of an LWH.

6. A method for developing a wiring design for a complex system, the method being performed by execution of computer-readable program code by at least one central processing unit (CPU) of at least one computer system, the method comprising:

creating, using at least one of the CPUs, a master wire harness network (MWHN) within pathway space reservations of a pathway space-reservation network of a complex system, wherein the MWHN comprises a model of possible wiring pathways between equipment of the complex system, and wherein the MWHN includes a network of interconnected, unpopulated wire harness elements and termination device elements;

importing, using at least one of the CPUs, a subsystems definition into the MWHN, the subsystems definition being represented by interconnections between the equipment; and creating, using at least one of the CPUs, one or more logical net harnesses (LNHs) based upon the MWHN and the subsystems definition, the LNH comprising a collection of interconnections routed within the MWHN.

7. The method of claim 6, wherein creating one or more LNHs includes grouping the collection of interconnections into one or more compatible net family groups (CNFGs) and routing the CNFGs within the MWHN, the CNFGs including interconnections having at least one common attribute.

8. The method of claim 6 further comprising:
providing a complex system architecture, the architecture including a pathway space-reservation network, the pathway space-reservation network including pathway space reservations for placement of wiring interconnecting equipment of the complex system.

9. The method of claim 6 further comprising:
creating one or more logical wire harnesses (LWHs) based upon the LNHs, the LWH comprising a collection of wiring elements and termination devices associated with a respective wire harness element of the MWHN.

10. The method of claim 9 further comprising:
deriving one or more end-item configurations (EICs) for the complex system based upon the LWHs, the EIC comprising a unique collection of one or more wiring elements and termination devices of an LWH.

11. A computer program product for developing a wiring design for a complex system, the computer program product comprising a computer-readable storage medium having computer-readable program code portions stored therein, the computer-readable program portions comprising:

a first executable portion for creating a master wire harness network (MWHN) within pathway space reservations of a pathway space-reservation network of a complex system, wherein the MWHN comprises a model of possible wiring pathways between equipment of the complex system, and wherein the MWHN includes a network of interconnected, unpopulated wire harness elements and termination device elements;

a second executable portion for importing a subsystems definition into the MWHN, the subsystems definition being represented by interconnections between the equipment; and a third executable portion for creating one or more logical net harnesses (LNHs) based upon the MWHN and the subsystems definition, the LNH comprising a collection of interconnections routed within the MWHN.

12. The computer program product of claim 11, wherein the third executable portion is adapted to create one or more LNHs including grouping the collection of interconnections into one or more compatible net family groups (CNFGs) and routing the CNFGs within the MWHN, the CNFGs including interconnections having at least one common attribute.

13. The computer program product of claim 11 further comprising:
a fourth executable portion for providing a complex system architecture, the architecture including a pathway space-reservation network, the pathway space-reservation network including pathway space reservations for placement of wiring interconnecting equipment of the complex system.

14. The computer program product of claim 11 further comprising:
a fourth executable portion for creating one or more logical wire harnesses (LWHs) based upon the LNHs, the LWH comprising a collection of wiring elements and termination devices associated with a respective wire harness element of the MWHN.

15. The computer program product of claim 14 further comprising:
a fifth executable portion for deriving one or more end-item configurations (EICs) for the complex system based upon the LWHs, the EIC comprising a unique collection of one or more wiring elements and termination devices of an LWH.

* * * * *